United States Patent
Ho et al.

(10) Patent No.: US 12,409,490 B2
(45) Date of Patent: Sep. 9, 2025

(54) LIGHT-MEDIATED MANIPULATION OF DROPLETS STABILIZED BY FLUORINATED NANOPARTICLES WITH PHOTOTHERMAL EFFECT

(71) Applicant: The Chinese University of Hong Kong, Hong Kong (CN)

(72) Inventors: Yi-Ping Ho, Hong Kong (CN); Guangyao Cheng, Yueyang (CN); Sebastian Beyer, Hong Kong (CN); Ho Pui Ho, Hong Kong (CN); To Ngai, Hong Kong (CN); Kuan Ting Lin, Kaohsiung (TW)

(73) Assignee: The Chinese University of Hong Kong, Hong Kong (CN)

( * ) Notice: Subject to any disclaimer, the term of this patent is extended or adjusted under 35 U.S.C. 154(b) by 195 days.

(21) Appl. No.: 17/753,362

(22) PCT Filed: Aug. 24, 2020

(86) PCT No.: PCT/CN2020/110715
§ 371 (c)(1),
(2) Date: Feb. 28, 2022

(87) PCT Pub. No.: WO2021/036967
PCT Pub. Date: Mar. 4, 2021

(65) Prior Publication Data
US 2022/0314313 A1    Oct. 6, 2022

Related U.S. Application Data

(60) Provisional application No. 62/892,101, filed on Aug. 27, 2019.

(51) Int. Cl.
B22F 1/102    (2022.01)
B01D 63/00    (2006.01)
(Continued)

(52) U.S. Cl.
CPC ............ *B22F 1/102* (2022.01); *B01D 63/005* (2013.01); *B22F 1/054* (2022.01); *B22F 1/07* (2022.01); *B22F 1/17* (2022.01)

(58) Field of Classification Search
None
See application file for complete search history.

(56) References Cited

U.S. PATENT DOCUMENTS 8,206,994 B2    6/2012    Baroud et al.
9,102,576 B1    8/2015    Spowart et al.
(Continued)

FOREIGN PATENT DOCUMENTS

CN    106178996 A    12/2016
CN    108232131 A    6/2018
(Continued)

OTHER PUBLICATIONS

Jouet, R.J. et al., "Surface Passivation of Bare Aluminum Nanoparticles Using Perfluoroalkyl Carboxylic Acids", Chemistry of Materials, vol. 17, pp. 2987-2996, Published on Web May 3, 2005.*

(Continued)

*Primary Examiner* — George Wyszomierski
(74) *Attorney, Agent, or Firm* — Saliwanchik, Lloyd & Eisenschenk

(57) ABSTRACT

Fluorinated metal nanoparticles (f-MNPs) are metal nanoparticles and/or semiconductor nanoparticles having a plurality of fluorinated alkyl ligands attached to the surfaces of the nanoparticles where the f-MNPs are greater than 20 nm in cross-section. The f-MNPs can be used as a surfactant to form active f-MNPs stabilized aqueous droplet, which can be used in a light-mediated microfluidic device where droplet movement, merging, splitting, and sorting can be carried out as directed by one or more laser beams focused onto one or more spots of light-mediated microfluidic device.

12 Claims, 17 Drawing Sheets

(51) Int. Cl.
*B22F 1/054* (2022.01)
*B22F 1/07* (2022.01)
*B22F 1/17* (2022.01)

(56) References Cited

U.S. PATENT DOCUMENTS

| | | | |
|---|---|---|---|
| 9,308,582 B2 | 4/2016 | Sun et al. | |
| 2009/0090440 A1* | 4/2009 | Kellett | C06B 45/30 |
| | | | 149/9 |
| 2016/0114325 A1 | 4/2016 | Tang et al. | |
| 2023/0241675 A1* | 8/2023 | Grigorenko | B22F 1/0551 |
| | | | 106/31.65 |

FOREIGN PATENT DOCUMENTS

| | | |
|---|---|---|
| JP | 2017-95640 A | 6/2017 |
| KR | 10-2016-0106388 A | 9/2016 |
| WO | 2007/138178 A2 | 12/2007 |

OTHER PUBLICATIONS

Mathiyazhakan, M. et al., "A Concise Review of Gold Nanoparticles-Based Photo-Responsive Liposomes for COntrolled Drug Delivery", Nano-Micro Letters, vol. 10, Issue 1, Article 10, Published online Oct. 31, 2017.*

Nishio, T. et al., "Self-lubricating nanoparticles: self-organization into 3D-superlattices during a fast drying process", Chemical Communications, vol. 46, pp. 8977-8979, published Oct. 22, 2010.*

Shen, Y. et al., "Supramolecular Templates for Nanoflake-Metal Surfaces", Chemistry: A European Journal, vol. 15, pp. 2793-2767 and supporting material, Jan. 20, 2009.*

International Search Report dated Oct. 28, 2020 in International Application No. PCT/CN2020/110715.

Cuenya, B.R., "Synthesis and catalytic properties of metal nanoparticles: Size, shape, support, composition, and oxidation state effects," Thin Solid Films, 2010, 518:3127-3150.

San, K.A., et al., "Synthesis of Alkanethiolate-Capped Metal Nanoparticles Using Alkyl Thiosulfate Ligand Precursors: A Method to Generate Promising Reagents for Selective Catalysis," Nanomaterials, 2018, 8(346):1-21.

Pengo, P., et al., "Gold Nanoparticles Protected by Fluorinated Ligands: Syntheses, Properties and Applications," Journal of Fluorine Chemistry, 2015, 177:1-19.

* cited by examiner

Interfacial tension ~ 34 mN/m

LIGHT-MEDIATED MANIPULATION OF DROPLETS STABILIZED BY FLUORINATED NANOPARTICLES WITH PHOTOTHERMAL EFFECT

CROSS-REFERENCE TO RELATED APPLICATIONS

This is the U.S. national stage application of International Patent Application No. PCT/CN2020/110715, filed Aug. 24, 2020; which claims the benefit of U.S. Provisional Patent Application Ser. No. 62/892,101, filed Aug. 27, 2019, which are hereby incorporated by reference in their entirety including any tables, figures, or drawings.

BACKGROUND OF THE INVENTION

The global market for microfluidics devices is forecasted to have double digit growth in the immediate future. The rapid growth of microfluidics industry is mainly driven by the rising demand for point-of-care (POC) devices with reduced cost and reagent consumption enabled by the miniaturization of microfluidic chips. Within the domain of microfluidics applications, screening platforms enabled by droplet microfluidics is anticipated to be commercially significant soon. One example is the droplet digital Polymerase Chain Reaction (ddPCR), which is a technology that became commercially available in 2011. Another viable and advancing commercial application is the single-cell genome sequencing technology. Both of these technologies are expected to constitute multi-billion USD industries in the near future. The potential of both ddPCR and single cell genome sequencing gives witness to the rising demand for innovative diagnostic techniques due to a general increase of health awareness worldwide. However, market growth is hindered due to the high cost of testing and materials, such as reagents and surfactants, and limited accessibility of appropriate devices because of their general high cost and complicated procedures for use.

A microfluidic device has a microfluidic circuit that comprises microscale components such as microchannels, addressable valves, and chambers through which fluid is allowed to flow in a deliberate manner. A microfluidic channel has somewhat analogous components to that often used to describe an electric circuit where electronic components are configured to bias the flow of electricity. A microfluidic circuit is designed for controlling flow rates, flow directions, particle separation, control mixing, and ultimately the reaction of chemicals for lab-on-a-chip operations.

One manner of manipulating the circuit is optically, as described in U.S. Pat. No. 8,206,994, where water drops stabilized by a nonionic surfactant is suspended in a transport fluid, such as a hydrocarbon or silicone oil, that reside in one or more microfluidic channels through which the drops flow and have their flow modified by a laser beam directed at the interface of the drops to effect sorting of the drops, dividing of drops into smaller drops, or fusing of smaller drops into larger drops, which can permit reactions between reagents contained within water drops. A light absorptive substance, like fluorescein, is added to the aqueous phase for optical manipulation. However, it is advantageous to avoid the addition of a light absorptive substance to the drops and even avoid most molecular surfactants, as these substances can bar development of a general method because of their potential reactivity with biomolecules and chemicals that may be desired in the drops. To this end, a method of stabilizing the drops, which allows interaction with light absent incorporation of other soluble chemicals, is desirable.

The foremost requests for the droplet-based assays are the stability of the droplets and the isolation of reagents in the droplets. Currently, the most popular continuous phase used in droplet microfluidics is the fluorinated oil such as HFE-7500 and FC-40 due to their excellent gas permeability, chemical inertness, and low toxicity. However, there is very limited selection of biocompatible fluorosurfactant available in the market.

Perfluoropolyethers (PFPEs) are a unique class of commercially available fluorosurfactants, however, their carboxylic hydrophilic head group interact with many biomolecules and polyelectrolytes, which limits their use for biological applications. Other commercially available surfactants with short fluorinated tails, such as 1H,1H,2H,2H-perfluoro-1-octanol (PFO), suffer from the problem of non-specific binding with proteins, such as fibrinogen. Amphiphilic molecules, such as perfluoro-polyethers, such as a polyethylene glycol (PEG) based block copolymers, have shown to be promising for preventing non-specific adsorption of biological materials, as well as enabling effective encapsulation of mammalian cells. However, the modification chemistry is relatively complex and optimal PEG reagents are not commercially available. The commercially available biocompatible fluorosurfactants are very costly, such as Pico-Surf from SphereFluidics, which makes it inaccessible for routine biological investigations. To address economic inaccessibility, a facile synthesis of a biocompatible fluorosurfactant having a nonionic tris(hydroxymethyl) methyl (Tris) polar head group was pursued. The resulting cost effective fluorosurfactant is compatible for use in diverse emulsion-based applications, including DNA polymeric nanoparticle synthesis, enzymatic activity assay, and bacterial or mammalian cell culture, in double- and multiphases emulsions.

The fluorous phase is immiscible in both aqueous and organic phases. Although it is generally assumed that transport of molecules from droplets suspended in a fluorous phase is insignificant, it has been observed that small fluorescent molecules, such as rhodamine, diffused and leaked from aqueous drops through a continuous phase of fluorinated solvents with nonionic fluorosurfactant functionalized by the PEG-amphiphilic block copolymer. The leakage has detrimental effects on the control of chemical or biological processes. Interfacial transport of fluorophores between droplets affects the reliability of the subsequent fluorescent signal. Therefore, there is a critical need to find an alternative solution to traditional surfactants.

Pickering emulsions, which are stabilized by colloid particles, are use in common strategies employed in food and cosmetics. These are usually much more stable than other emulsions as the particles adsorb or aggregate at the oil-water interface to form a solid shell that prevents coalescence.

Fluorinated silica nanoparticles (f-SNPs) are known to act as surfactants between fluorocarbon oils and an aqueous phase. The f-SNPs form highly stable emulsions, making them valuable for biomedical applications involving droplets with complex compositions. NP-based fluorosurfactants offer many advantages over traditional surfactants, including faster droplet formation and inertness to a broad range of reagents contained in the droplet phase. The silica NP-based surfactants are commercially available. Unfortunately, the f-SNPs cannot carry out any other functions in microfluidic devices other than stabilizing a droplet. Hence there remains a need for a stable fluorinated surfactant that is inert, resist reagent leakage from a stabilized water droplet, and can affect motion and manipulation of droplets within a microfluidic device.

BRIEF SUMMARY OF THE INVENTION

An embodiment of the invention is directed to fluorinated metal nanoparticles (f-MNPs) comprising metal nanoparticles and/or semiconductor nanoparticles whose surface is decorated with a plurality of fluorinated alkylligands, where the fluorinated metal or semiconductor nanoparticles are greater than 20 nm in cross-section. The metal can be gold, silver, platinum, nickel, palladium, cobalt, rhodium, rhenium, titanium, zinc, cerium, iron, iridium, and thallium. A mixture of different f-MNPs can be a mixture of different metals with equal or different portions of the different f-MNPs. The fluorinated alkyl ligand is either from a perfluoroalkanethiol of 6 to 26 carbons, such as but not limited to 1H,1H,2H,2H-perfluorodecanethiol, or from perfluoroalkoxysilane such as but not limited to perfluorooctyltriethoxysilane, mediated by a layer of silica shell.

Another embodiment of the invention is directed to a method of forming f-MNPs having a size greater than 20 nm, where an aqueous suspension of metal or semiconductor nanoparticles (collectively, "MNPs"), are combined with a fluorinated liquid comprising a fluorinated ligand as a two-phase fluid in a centrifuge tube. The two-phase fluid is centrifuged to deposit the MNPs below the fluorinated liquid. After separating the aqueous solution from the fluorinated liquid and the MNPs, the MNPs are suspended in the fluorinated liquid. The formation of the f-MNPs is formed by reaction of the MNPs with the fluorinated ligand during centrifugation and suspension. The fluorinated liquid can include a fluorinated solvent, such as, but not limited to FC-40.

In an embodiment of the invention the f-MNPs are surfactants for an active f-MNPs stabilized aqueous droplet comprising an aqueous core stabilized by a plurality of f-MNPs. An unconfined active f-MNPs stabilized aqueous droplet suspended in a fluorinated solvent is a sphere with a diameter of 0.5 to 500 µm. The active f-MNPs stabilized aqueous droplet can have an aqueous phase that is a solution comprising at least one chemical and/or at least one biomolecule.

In another embodiment of the invention, the plurality of active f-MNPs stabilized aqueous droplets, at least one laser, and, optionally, a feature to mechanically split an isolated active f-MNPs stabilized aqueous droplet comprise a light-mediated microfluidic device where at least one laser is tuned to a plasmon resonance frequency for each of the f-MNPs that have different metals. At least one second laser can be tuned to an absorbance frequency of a fluorescent or phosphorescent chemical contained in at least a portion of the active f-MNPs stabilized aqueous droplets that contain the light active chemical.

In an embodiment of the invention, the light-mediated microfluidic device is used to carry out a process of manipulating active f-MNPs stabilized aqueous droplets contained in the light-mediated microfluidic device. Upon irradiating a spot in the light-mediated microfluidic device, that laser light spot promotes the stoppage or start of movement for one of the plurality of active f-MNPs stabilized aqueous droplets that come in the vicinity of or on the focus of the spot. The spot can also promote the merging of a contacting pair of the active f-MNPs stabilized aqueous droplets that come in the vicinity of the spot. When the active f-MNPs stabilized aqueous droplet contains a fluorescent or phosphorescent chemical, a second laser spot from a laser beam tuned to the absorption frequency for the fluorescent or phosphorescent chemical irradiates the light-active chemicals in the droplet and causes fluorescence or phosphorescence. The emission can subsequently be detected to control the switching on and off of a laser spot that causes stoppage or start of movement for the fluorescing or phosphorescing active f-MNPs stabilized aqueous droplets. When the spot resides adjacent to a feature to promote mechanically splitting of an isolated active f-MNPs stabilized aqueous droplet, the spot can modify the splitting mode from equal splitting to unequal splitting into two smaller active f-MNPs stabilized aqueous droplets. At least one laser spot that causes stoppage or starting of movement of f-MNPs stabilized aqueous droplets can reside in the junction of at least two downstream microfluidic channels to sort the droplets into either one of the downstream channels based on the fluorescence or phosphorescence.

DETAILED DISCLOSURE OF THE INVENTION

Embodiments of the invention are directed to the stabilization of water comprising droplets with functionalized nanoparticles that exhibit a photothermal effect as "active" stabilizers. The functionalized nanoparticles can be metallic nanoparticles or semiconductor nanocrystals. These "active" stabilizers not only stabilize the aqueous drops, but also promote a light-mediated manipulation of the drops. Although the metal can be any metal that is generally inert to the chemicals included in the water drops, in an exemplary embodiment of the invention, the nanoparticles are gold nanoparticles. The gold nanoparticles are surface modified to promote their suspension in a fluid useful for water droplet suspension microfluidic applications. In this embodiment of the invention, fluorinated gold nanoparticles (f-AuNPs) are suspended in a fluorinated solvent, such as, but not limited to, FC-40, a mixture of perfluoro-tri-n-butylamine and perfluoro-di-n-butylmethylamine, or HFE-7500, 3-ethoxy-perfluoro-2-methylhexane. The size of the AuNPs can be controlled to stabilize very small droplets and tune the plasmonic effect by which local heating in the fluid can effect the droplets movement and behavior in the fluid. The f-AuNPs stabilized water droplet and its interaction with light is illustrated in FIG. 1.

The f-AuNPs have a fluorinated surface that organizes to stabilize aqueous droplets in fluorous phase to prevent coalescence of droplets and inhibit molecular transportation through droplets interface. The optical properties of f-AuNPs allows a laser beam to manipulate the behavior of f-AuNPs stabilized droplets in a microfluidic device comprising the f-AuNPs stabilized droplets, according to an embodiment of the invention. The laser excitation enables the merge, movement, splitting and sorting of f-AuNPs stabilized droplets.

Figure 2A:
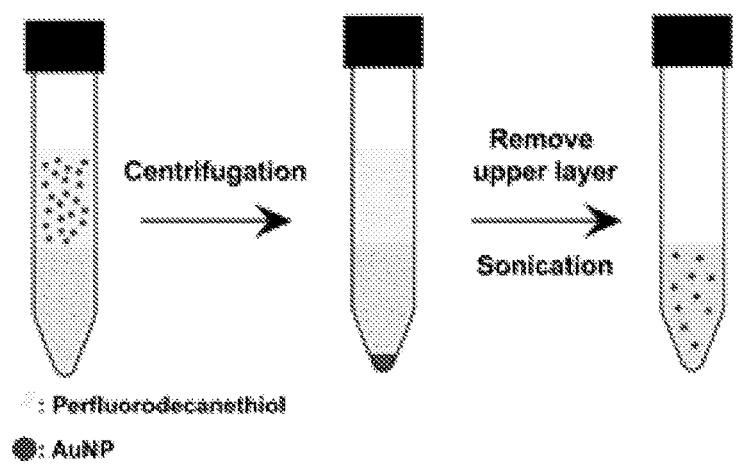
FIG. 2A shows a synthesis protocol for the formation of f-AuNPs by centrifuge promoted phase transfer of AuNPs while undergoing ligand exchange, according to an embodiment of the invention.
Figure 2B:
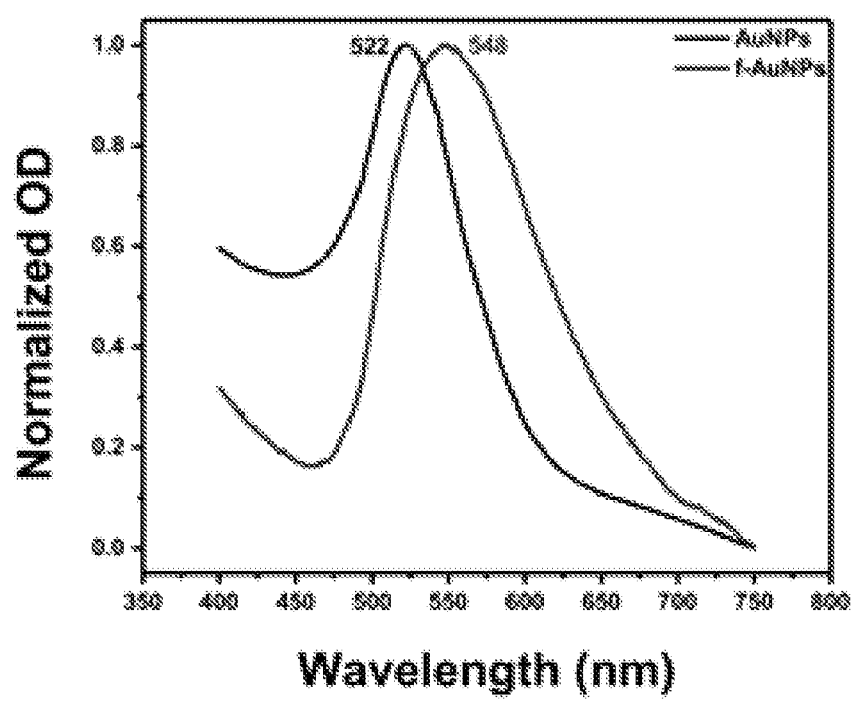
FIG. 2B shows an absorption spectrums of the AuNPs and f-AuNPs formed as in FIG. 2A.

Theoretically, the energy required to remove a nanoparticle from the interface scales with the square of particle's radius. Hence, larger particles induce higher stability to particle decorated droplets. According to an embodiment of the invention, to achieve larger particles, such as >20 nm f-AuNPs, ligand exchange is combined with centrifugation, as shown in FIG. 2A. A metal ligand surfactant, such as, 1H,1H,2H,2H-perfluorodecanethiol, dissolved in the fluorinated solvent, such as, FC-40, is combined with an AuNPs hydrosol in a centrifuge vessel, such as a centrifugation tube, resulting in an immiscible water-AuNPs/FC-40-ligand surfactant interface. Upon centrifugation of the two-phase system, AuNPs are forced to the bottom of the tube under the FC-40 layer. After removal of the particle-free upper aqueous layer, the FC-40 layer and nanoparticles are sonicated to obtain f-AuNPs in FC-40, which can be freed of residual ligand surfactant by successive centrifugation and resuspension sequences. The absorption spectrums of AuNPs and f-AuNPs formed in this manner, are shown in FIG. 2B, where a red shift of absorbance peak from 522 nm for AuNPs to 548 nm for f-AuNPs indicates an ligand binding to the surface of AuNPs and a lack of peak broadening suggests no agglomeration during the dispersion of f-AuNPs in FC-40. The red AuNPs form purple f-AuNPs, which is consistent with the peak shift of absorption spectrum.

Figure 1:
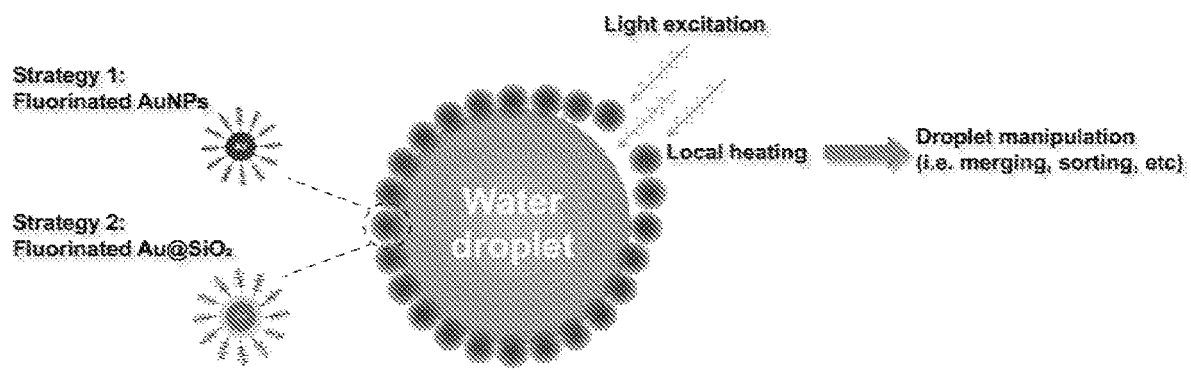
FIG. 1 shows the structure of an active f-AuNPs stabilized water droplet, according to an embodiment of the invention.

The fluorinated metal nanoparticles can have a metal-silica core-shell structure, as illustrated for gold-silica core-shell nanoparticles in FIG. 1. The fluorination of silica shells can be easily achieved by a well-established salinization process with perfluoroalkoxysilane chemicals, such as perfluorooctyltriethoxysilane. In addition, the higher refractive index silica shell has the potential to increase the light absorption capability of gold nanoparticles, which is favorable for the optical manipulation of droplets.

Using f-AuNPs in FC-40 as continuous phase, monodispersed aqueous droplets can be generated within microfluidic chips. As shown in FIG. 1, the aqueous droplets are stabilized by a layer of f-AuNPs residing at the water/oil interface. The assembled f-AuNPs at the interface facilitates the light-mediated droplet manipulation. By a localized surface plasmon resonance effect, f-AuNPs selectively absorbs light at specific wavelength and converts the energy of the photons to heat, leading to a temperature increase localized at the light nanoparticle surface. The temperature increase destabilizes the f-AuNPs layer, leading to droplets merging when droplets are in contact. In addition, because the surface tension is lower at the higher temperature region, a gradient of surface tensions is generated between illuminated and non-illuminated region to initiate droplet movement at a direction opposite to the surface tension gradient, which is known as Marangoni flow or thermocapillary effect. By illuminating a region, momentum of a droplet is blocked at the region pushing the droplet away imparting the droplet motion to instigate moving, splitting and sorting.

Figure 3A:
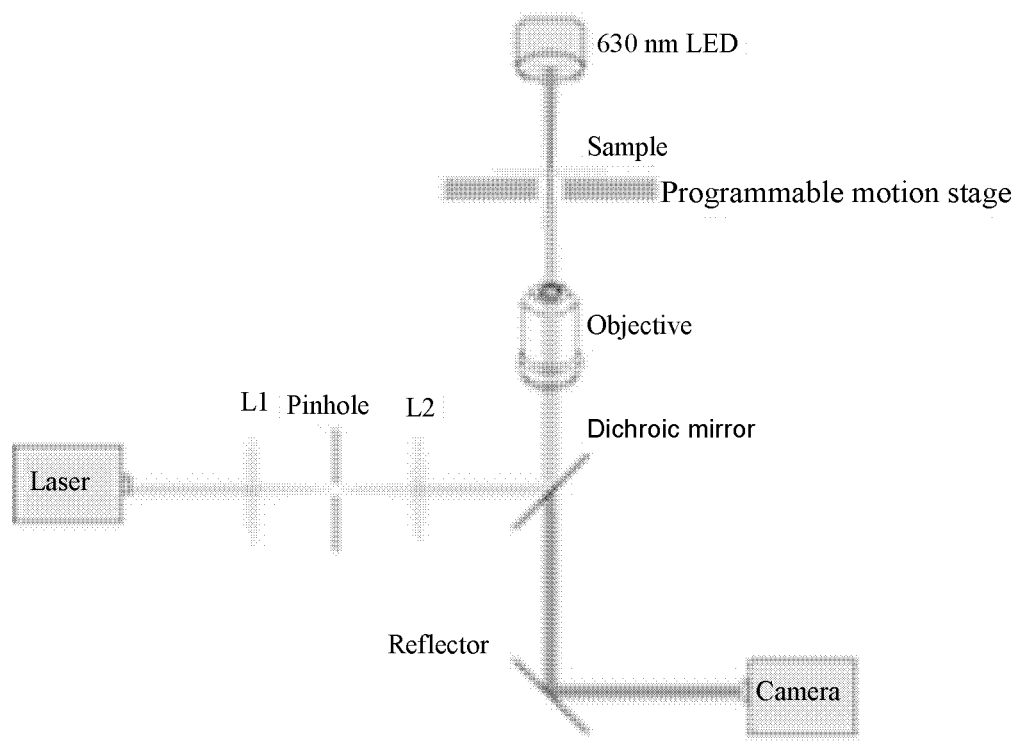
FIG. 3A is a drawing of an optical system for the irradiation of f-AuNPs and observation of f-AuNPs droplets.

An optical platform, as illustrated in FIG. 3A, allows simultaneous irradiation of the f-AuNPs on the droplet surface and observation of changes in the droplet's behavior.

Figure 3B:
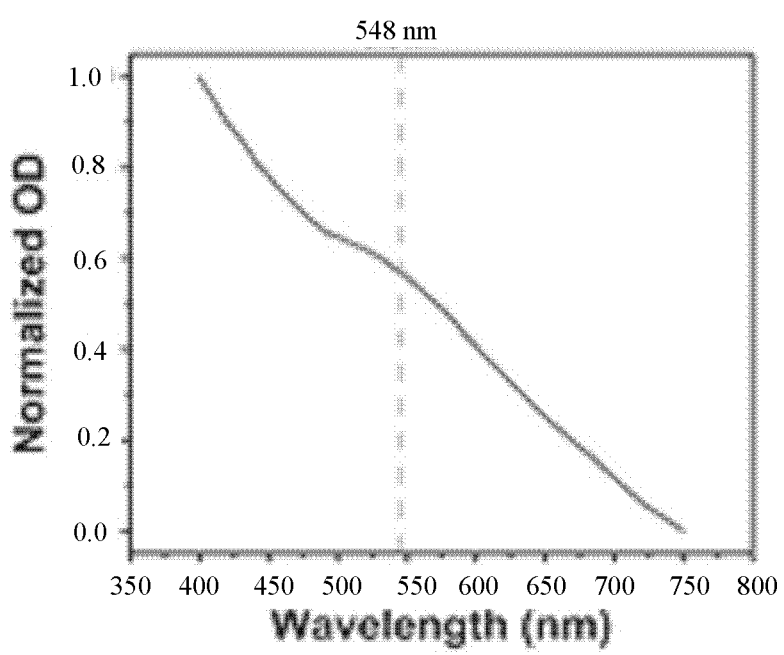
FIG. 3B shows an extinction spectrum of water-in-oil droplets formed using f-AuNPs, where, due to the strong light scattering of droplets, a hump at 548 nm consistent with the absorption peak of f-AuNPs is observed.
Figure 3C:
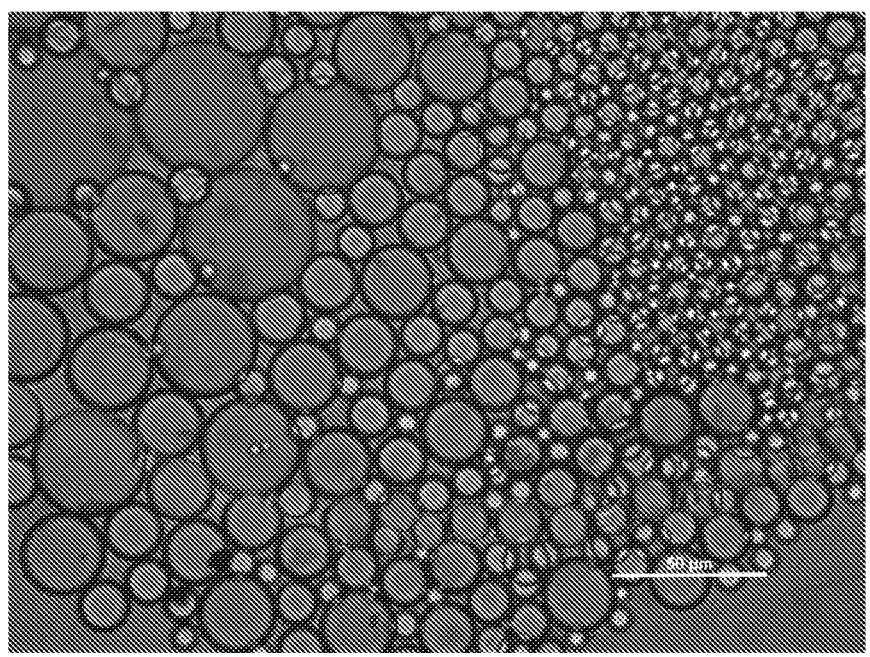
FIG. 3C is a microscopic image of stable water-in-oil droplets produced by shaking a two-phase fluid of water and FC-40 containing f-AuNPs.

No peak shift of f-AuNPs, as indicated in FIG. 3B, occurs at the interface of water-in-oil droplet, shown in FIG. 3C. Therefore, a beam of laser of a wavelength close to the absorption peak for f-AuNPs is useful as an irradiation source. Adjusting the size of AuNPs allows balancing the droplet stability with optimization of the plasmonic effect. The droplets can then be guided by the laser for merging, moving, splitting and sorting.

Figure 4A:
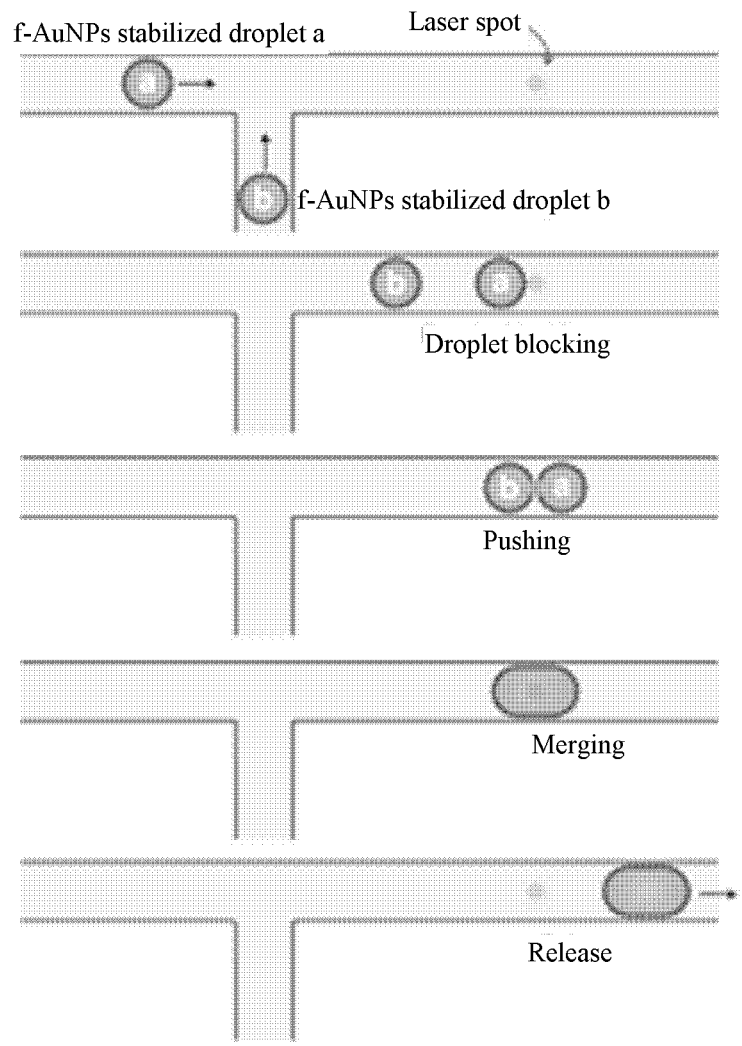
FIG. 4A shows a time sequence of events at and post an intersection of two microchannels of a microfluidic device to introduce a pair of f-AuNPs stabilized droplets, where force contact, merge and ultimate release are induced by a laser beam, according to an embodiment of the invention.
Figure 4B:
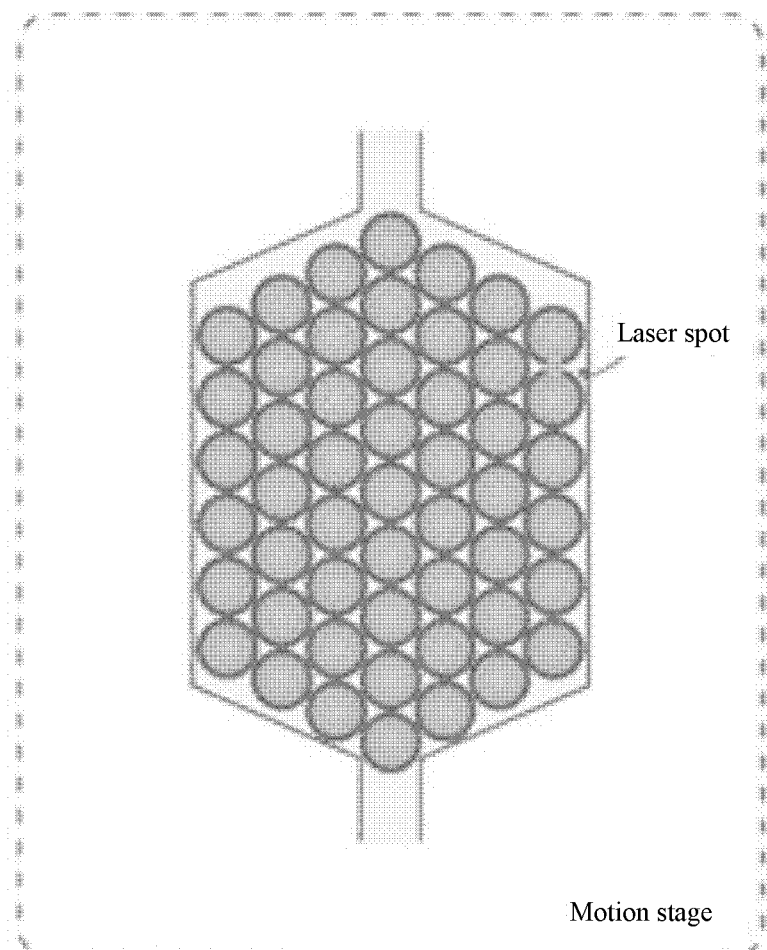
FIG. 4B shows a drawing suggesting a laser beam induced selective merging of adjacent droplets residing in an array that is contained within a chamber situated on a moving stage, according to an embodiment of the invention.

The laser induced merging of f-AuNPs stabilized droplets can be modulated in two ways. In a first manner, as shown in FIG. 4A, when the front interface of droplet (a) arrives at the laser spot, its progress is blocked while droplet (b) continues on the path until a collision of droplet (b) pushes droplet (a) forward until their contacting interfaces encounter the laser spot which initiates merging of the droplets. The merged droplet is then released with the disappearance of the nanoparticle interface that had existed between the droplets. In a second manner, adjacent droplets stabilized by f-AuNPs confined in a chamber are selectively merged by irradiating a laser spot to a volume between two or more drops, as illustrated in FIG. 4B. Either the chamber can be immobilized on a motion stage and a fixed laser can be turned on to irradiate a desired interface, or a fixed stage can be irradiated upon moving the laser focus.

Figure 5:
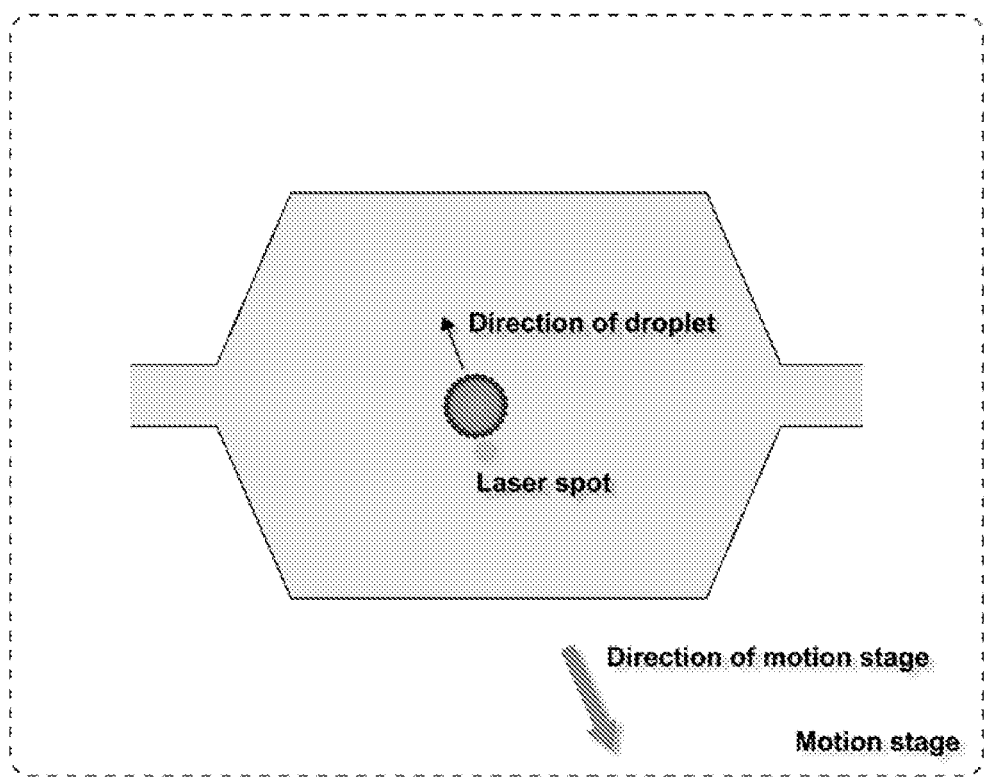
FIG. 5 shows a drawing that indicates the relative motion of an f-AuNPs stabilized droplet within a chamber situated on a moving stage where the relative motion is induced by a laser beam, according to an embodiment of the invention.

Moving an f-AuNPs stabilized droplet in a microfluidic chip is illustrated in FIG. 5. The chip is immobilized on a motion stage and a laser spot is initiated that pushes a droplet away, where the droplet is moved within the chamber by moving the motion stage in a direction opposite that of the moving motion stage.

Figure 6A:
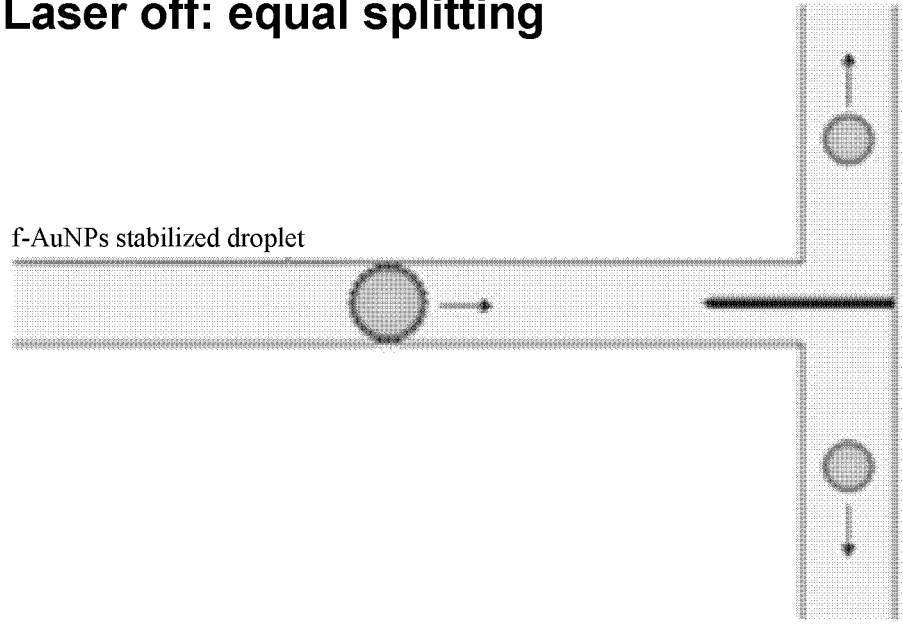
FIG. 6A shows a drawing for splitting of f-AuNPs stabilized droplets, according to an embodiment of the invention, where a single drop is equally split into two daughter droplets at a dividing feature at an intersection of microchannels in a microchannel device.
Figure 6B:
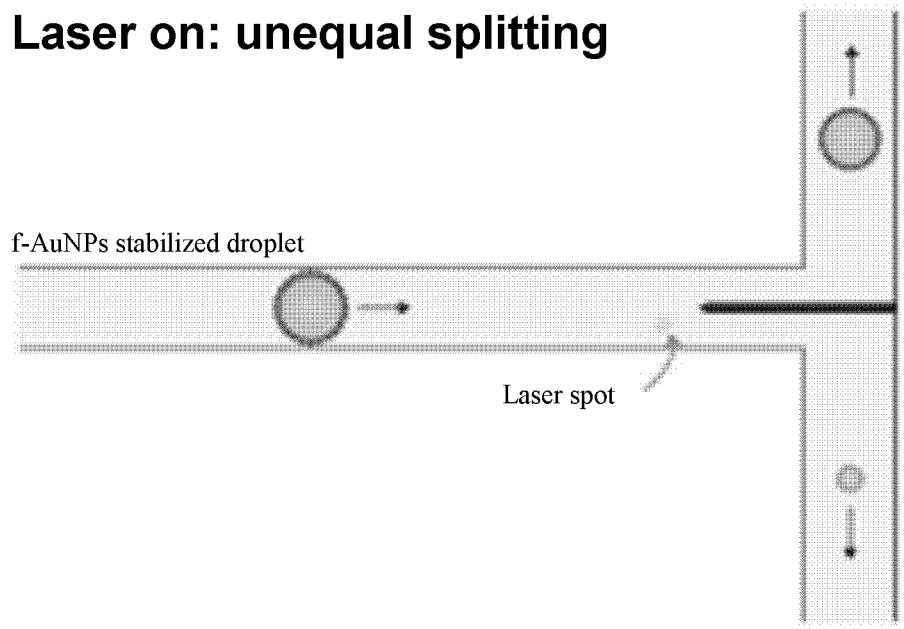
FIG. 6B shows a drawing for splitting of f-AuNPs stabilized droplets, according to an embodiment of the invention, where a single drop is unequally split into two daughter droplets at a dividing feature at an intersection of microchannels in a microchannel device when a laser beam imposes blocking of a portion of the entry microchannel.

Splitting of an f-AuNPs stabilized droplet induced by laser is illustrated in FIGS. 6A and 6B. The laser spot is positioned slightly before the junction, deviated from the center line. When the laser is off, as in FIG. 6A, a droplet is split into two equally sized child droplets in a symmetrical channel structure. When the laser is on, as in FIG. 6B, a laser spot will transiently block the advance of the droplet, inducing an unequal splitting to two unequally sized child droplets. The position of laser spot in channel can be finely tuned by a motion stage, on which the channel is immobilized, to enable child droplets of varying ratio to be generated.

Figure 7A:
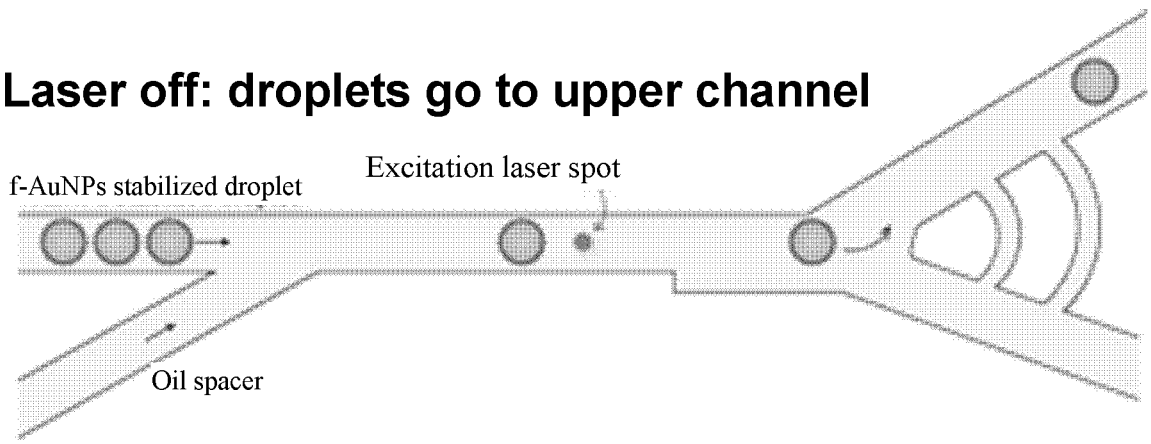
FIG. 7A shows a drawing of microchannels of a microfluidic device where an excitation laser beam tags an f-AuNPs stabilized droplet for sorting, according to an embodiment of the invention, where the tagged f-AuNPs stabilized droplet is not influenced in its flow.
Figure 7B:
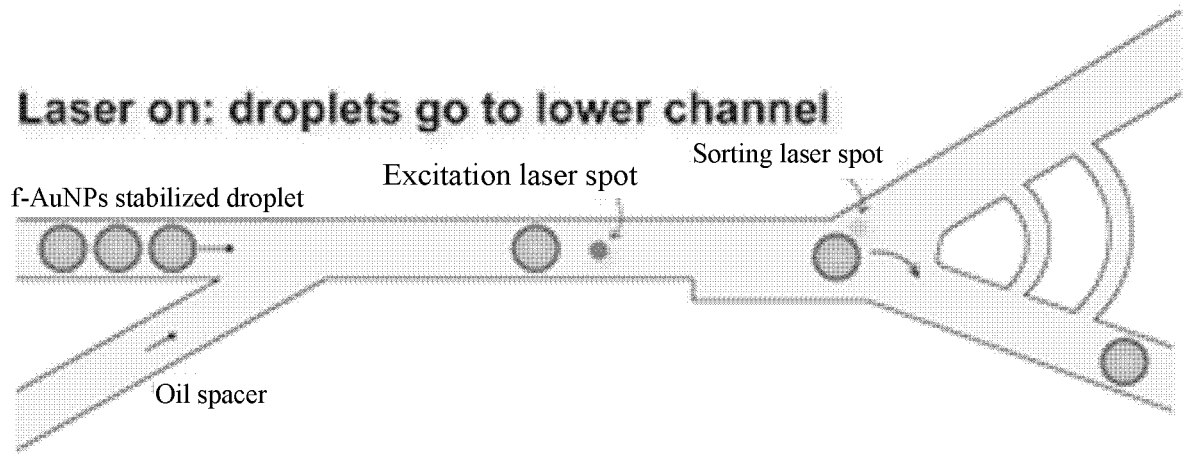
FIG. 7B shows a drawing of microchannels of a microfluidic device where an excitation laser beam tags an f-AuNPs stabilized droplet for sorting, according to an embodiment of the invention, where the tagged f-AuNPs stabilized droplet is influenced in its flow by a sorting laser beam that bars the normal flow bias.

Fluorescence-activated sorting of f-AuNPs stabilized droplets is illustrated in FIGS. 7A and 7B. A laser beam upstream of the junction is used for fluorescence excitation of a droplet's contents using an excitation laser. The laser induced fluorescence can be detected by a photomultiplier tube (PMT) detector. A second laser beam, a sorting laser, can be positioned at the sorting junction. The detector can be interfaced with the sorting laser such that when droplets that have not been excited because the excitation laser was not focused on the drop or the drop is free of a component that can fluoresce move through the excitation laser spot, no fluorescence signal can be detected by the PMT and the sorting laser remains off such that the non-fluorescing droplets flow into the upper channel because of the lower hydraulic resistance imposed by its size and/or geometry, as shown in FIG. 7A. In contrast, fluorescing droplets allow detection by the PMT, which induces a delayed voltage pulse that switches on the sorting laser that modifies the direction of the droplets resulting in their flow into the lower channel, as shown in FIG. 7B.

The f-AuNPs promote control in a microfluidic device, according to an embodiment of the invention, by a photothermal effect are introduced by the "active" stabilizer comprising f-AuNPs stabilized droplets in a fluorous phase. Uniform sized droplets, that are carefully designed for their content and size, are produced and operated upon optically to promote selective droplet merging (fusion), droplet moving, droplet splitting, and droplet sorting. These activated droplets allow large-scale complex biological and chemical assays using the microfluidic device, according to an embodiment of the invention.

In addition to manipulation of droplets by active control, operations can be passively carried out. Droplet fusion, for example, does not require activation by a laser beam or other external force field, and may be accomplished by having a pair of droplets of less than complete surface coverage surfactant concentrations in immediate proximity. Passive fusion may occur where there is sufficient coverage, however, the rate at which the inactivated phenomena occurs, by forces such as surface tension fluctuations, would generally be slow relative to active perturbation. To include passive control, careful consideration of the chemistry of the droplet system is required. This requirement is considerably lessened in the active system, according to an embodiment of the invention. In other active systems, control is through electrocoalescence, dielectrophoresis (DEP) and optical tweezers. For example, DEP based fusion is achieved through an introduction of a non-uniform electric field where, as two droplets are pulled close to the electrode, the layer of continuous phase separating them becomes thin, and the instabilities in the surface tension between the droplets result in their fusion. The use of electricity may hasten the development of instabilities in the surface tension between the interfaces, thereby providing a much faster (usually kHz) processing speed. Electro-activated controls are inherently more complex than many passive systems, as many require fabrication of electrodes and precise timing of electrical signals in order to fuse droplets. The use of electricity also raises concerns of contamination between droplets if some droplet contents become deposited on an electrode and concerns of the biocompatibility of electrical signals with biological molecules, such as DNA or proteins. The optical platform of the microfluidic device, according to an embodiment of the invention, takes advantages of the surface tension decreasing as the temperature of the liquid surrounding the droplets rises upon laser irradiation. All-optical control of droplets is adaptable as the manner of manipulation is reconfigurable in real-time in relatively simply mapped devices and does not require complicated fabrication to alter the devices function. Superior devices are those where the localized heating, which is proportional to intensity, can be affected as necessary to achieve a desired processing speed.

A comparison of the f-AuNPs relative to commercially available surfactants that can be employed in microfluidic devices employing fluorinated fluids is shown in Table 1, below.

TABLE 1

Comparison of the Fluorinated Gold and the Commercially Available Fluorosurfactants

|  | f-AuNPs | f-SNPs[a] | PEG-PFPE[b] | PEG-PFPE[c] |
|---|---|---|---|---|
| Droplet Stability | Good | Good | Good | Good |
| Leakage | Minimal | Minimal | Noticeable | Noticeable |
| Active Capable | Yes | No | No | No |
| Rel cost/unit[d] | ~1 | 54 | 90 | 35 |

[a]Dolomite, Fluoro-Phase;
[b]Sphere Fluidics, Pico-surf;
[c]RAN Biotechnologies;
[d]anticipated for f-AuNPs, actual per mL for f-SNP, actual per g for PEG-PFPE

EXEMPLARY EMBODIMENTS

Embodiment 1. Fluorinated metal nanoparticles (f-MNPs) comprising: a plurality of metal nanoparticles or semiconductor nanoparticles comprising a plurality of fluorinated alkyl ligands attached to the surface of each of the nanoparticles, where the fluorinated metal nanoparticles are greater than 20 nm in cross-section.

Embodiment 2. The f-MNPs according to Embodiment 1, wherein the metal of the plurality of metal nanoparticles is gold, silver, platinum, nickel, palladium, cobalt, rhodium, rhenium, titanium, zinc, cerium, iron, iridium, and thallium or where different of these metals are in a portion of the plurality of metal nanoparticles.

Embodiment 3. The f-MNPs according to Embodiment 1, wherein the fluorinated alkyl ligand is from perfluoroalkanethiol of 6 to 26 carbons, or perfluoroalkoxysilane mediated by a layer of silica shell.

Embodiment 4. The f-MNPs according to Embodiment 1, wherein the metal is gold and the fluorinated alkyl ligand is from 1H,1H,2H,2H-perfluorodecanethiol.

Embodiment 5. A method of forming an f-MNPs of a size greater than 20 nm, comprising:
providing an aqueous suspension of metal nanoparticles (MNPs);
providing a fluorinated liquid comprising a fluorinated ligand;
combining the aqueous suspension of MNPs and the fluorinated liquid to yield a two-phase fluid in a centrifuge tube;
centrifuging the two-phase fluid to deposit the MNPs below the fluorinated liquid;
separating the aqueous solution from the fluorinated liquid and the MNPs; and
suspending the MNPs in the fluorinated liquid, to yield a plurality of f-MNPs according to Embodiment 1 suspended in the fluorinated liquid.

Embodiment 6. The method according to Embodiment 5, wherein the fluorinated liquid further comprises a fluorinated solvent.

Embodiment 7. The method according to Embodiment 6, wherein the fluorinated solvent is FC-40.

Embodiment 8. An active f-MNPs stabilized aqueous droplet, comprising an aqueous core stabilized by a plurality of f-MNPs according to Embodiment 1, wherein the diameter of an unconfined active f-MNPs stabilized aqueous droplet suspended in a fluorinated solvent is a sphere with a diameter of 0.5 to 500 μm.

Embodiment 9. The active f-MNPs stabilized aqueous droplet according to Embodiment 8, wherein the droplet is a solution comprising at least one chemical and/or at least one biomolecule.

Embodiment 10. A light-mediated microfluidic device, comprising a plurality of active f-MNPs stabilized aqueous droplets according to Embodiment 8, at least one laser, and, optionally, a feature to mechanically split an isolated active f-MNPs stabilized aqueous droplet wherein at least one laser of the at least one laser is tuned to a plasmon resonance frequency for the f-MNPs.

Embodiment 11. The light-mediated microfluidic device according to Embodiment 10, wherein at least a second laser of the at least one laser is tuned to an absorbance frequency of a fluorescent or phosphorescent chemical within the active f-MNPs stabilized aqueous droplet.

Embodiment 12. A method of manipulating an active f-MNPs stabilized aqueous droplet in a light-mediated microfluidic device according to Embodiment 10, comprising:
introducing the plurality of active f-MNPs stabilized aqueous droplets into a light-mediated microfluidic device;
irradiating at least one spot in the light-mediated microfluidic device; and
promoting stoppage of movement or initiation of movement of one of the plurality of active f-MNPs stabilized aqueous droplets that come in the vicinity or on the focus of the spot; or
promoting merging of a contacting pair of the plurality of active f-MNPs stabilized aqueous droplets that come in the vicinity or on the focus of the spot.

Embodiment 13. The method according to Embodiment 12, wherein a portion of the active f-MNPs stabilized aqueous droplets contains a fluorescent or phosphorescent chemical.

Embodiment 14. The method according to Embodiment 13, further comprising activating the fluorescent or phosphorescent chemical by irradiating a laser beam at the absorption frequency of the fluorescent or phosphorescent chemical and detecting the fluorescence or phosphorescence.

Embodiment 15. The method according to Embodiment 12, wherein the irradiating of the spot in the light-mediated microfluidic device is controlled by detecting the fluorescence or phosphorescence.

Embodiment 16. The method according to Embodiment 12, wherein the spot resides adjacent to the feature to mechanically split an isolated active f-MNPs stabilized aqueous droplet such that during irradiating the spot the active f-MNPs stabilized aqueous droplet undergoes splitting into two unequally sized active f-MNPs stabilized aqueous droplets.

Embodiment 17. The method according to Embodiment 12, wherein at least one spot resides in the junction of at least two downstream microfluidic channels to direct the droplets into one of the downstream channels.

EXAMPLES

Figure 8A:
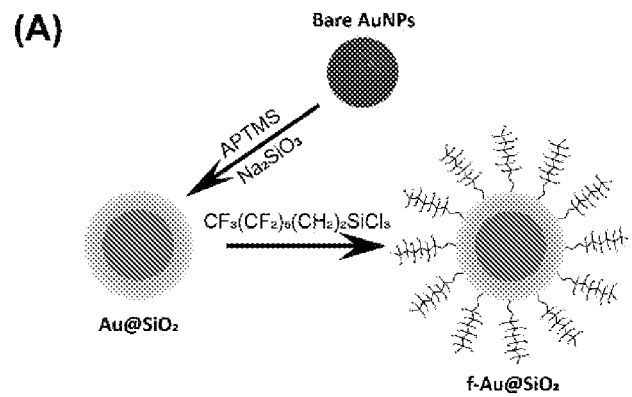
FIG. 8A shows a drawing of the protocol for f-Au@SiO$_2$synthesis.
Figure 8B:
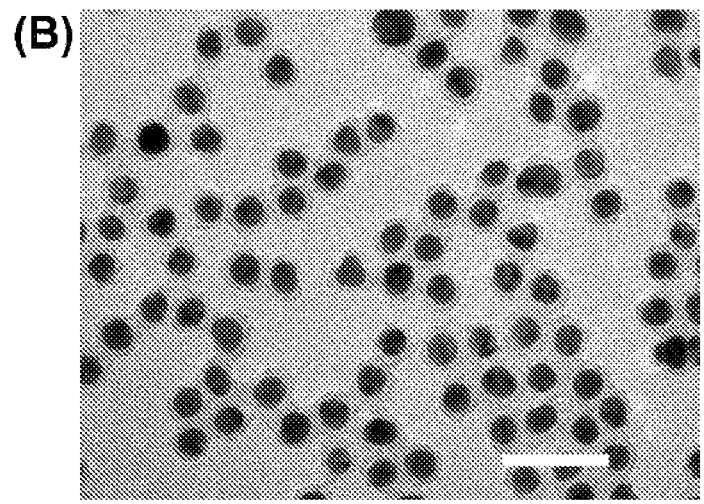
FIG. 8B shows the TEM image of Au@SiO$_2$. Scale bar: 50 nm.
Figure 8C:
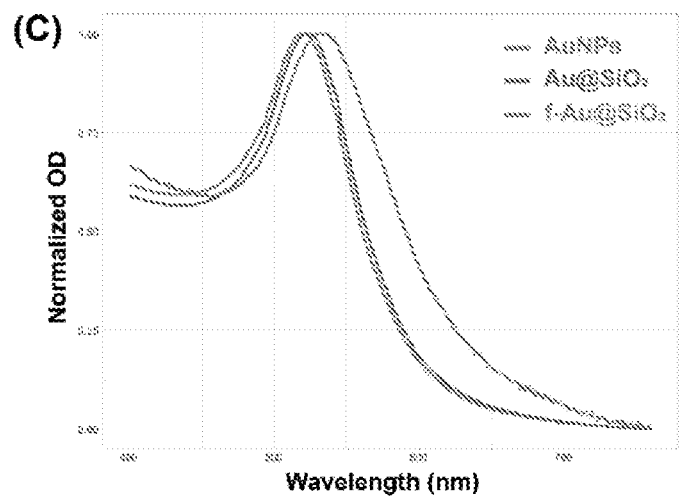
FIG. 8C shows the absorption spectrum of AuNPs, Au@SiO$_2$ and f-Au@SiO$_2$ synthesized as in FIG. 8A.
Figure 8D:
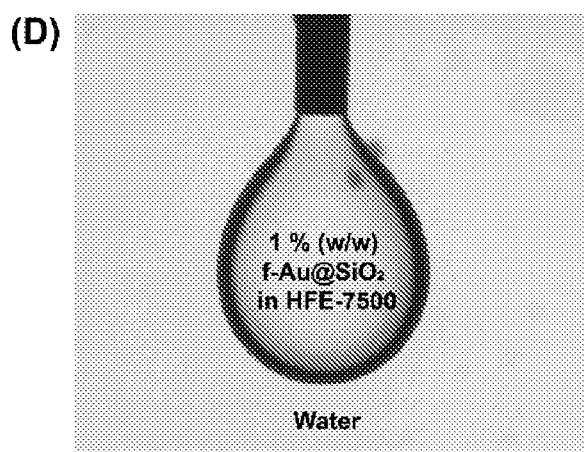
FIG. 8D shows the interfacial tension between HFE-7500 containing 1% (w/w) f-Au@SiO$_2$ and water measured by pendant drop method.

Example 1—Fluorinated Gold-Silica Core-Shell Nanoparticles (f-Au@SiO$_2$) as Alternative Demonstration of f-MNPs As illustrated in FIG. 1, the f-MNPs can have a metal-silica core-shell structure. Here, f-Au@SiO$_2$ is utilized as a demonstration. The protocol for f-Au@SiO$_2$ synthesis is shown in FIG. 8A. Bare AuNPs is coated with a uniform layer of silica shell, using (3-Aminopropyl)trimethoxysilane (APTMS) and sodium silicate (Na$_2$SiO$_3$) as the silane coupling agent and silica source, respectively. The thickness of the silica shell is well controlled from 2 to 4 nm. The gold-silica core-shell nanoparticles (Au@SiO$_2$) is then fluorinated with perfluorosilane such as Trichloro(1H,1H,2H,2H-perfluorooctyl)silane. The f-Au@SiO$_2$ is redispersed in fluorocarbon oil such as HFE-7500 after washing. The TEM image of Au@SiO$_2$ (FIG. 8B, scale bar: 50 nm) shows the success of silica coating on bare AuNPs. The thickness of the silica shell is around 4 nm. FIG. 8C shows the absorption of AuNPs, Au@SiO$_2$ and f-Au@SiO$_2$, respectively. A red shift of absorbance peak from 522 nm for AuNPs to 540 nm for f-Au@SiO$_2$ results from the silica coating and ligand binding to the surface of AuNPs, and a lack of peak broadening suggests no bulk agglomeration during the dispersion of f-Au@SiO$_2$ in HFE-7500. To characterize the ability of f-Au@SiO$_2$ to stabilize droplets, a pendant drop method is employed to measure the interfacial tension. The interfacial tension between HFE-7500 and water is decreased from 55 mN/m (without f-Au@SiO$_2$, not shown here) to 34 mN/m (FIG. 8D, with 1% (w/w) f-Au@SiO$_2$), which is the basis for droplet stabilization.

Figure 9A:
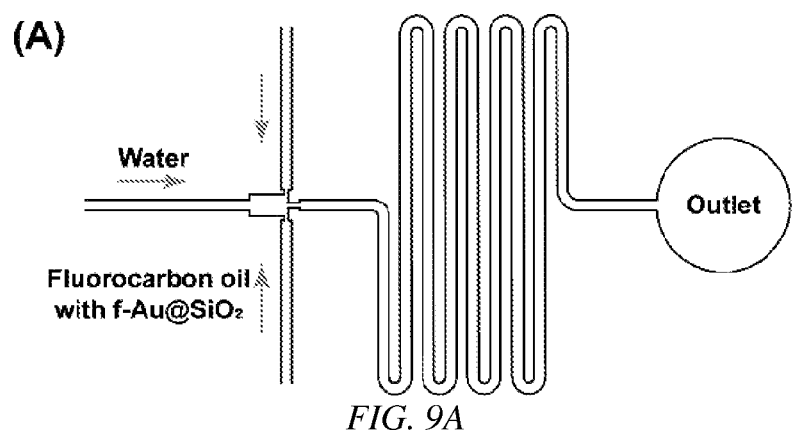
FIG. 9A shows a drawing of the operation scheme of f-Au@SiO$_2$ stabilized droplet generation in flow-focusing channel.
Figure 9B:
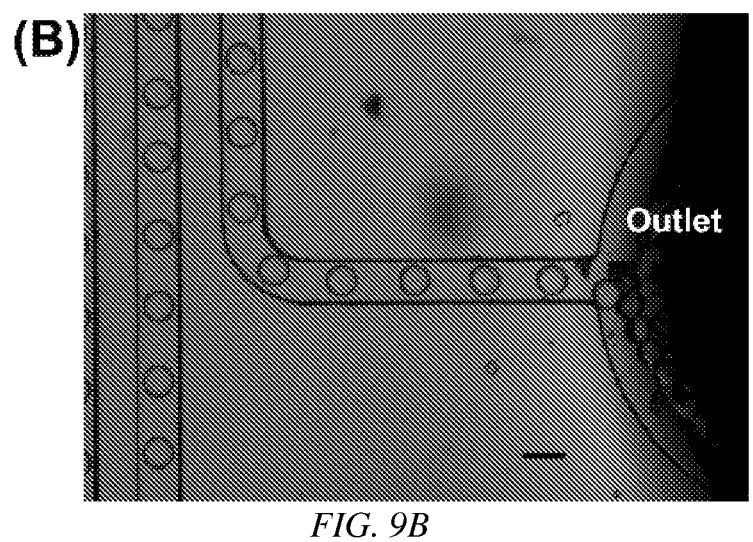
FIG. 9B shows the microscopic image showing the f-Au@SiO$_2$ stabilized droplets generated. Scale bar: 100 μm.

A flow-focusing channel is used to generate water-in-oil droplets, as illustrated in FIG. 9A. At the cross junction, the water phase is sheared by the fluorocarbon oil phase to form discrete droplets, with f-Au@SiO$_2$ dispersed in the oil phase functioning as the stabilizer. The long serpentine channel at downstream of the junction allows sufficient time for f-Au@SiO$_2$ to attach to the water/oil interface. FIG. 9B shows the microscopic image of droplets generated during experiment. Droplets are not coalescing even when touching with each other at the outlet, indicating an effective stabilization of f-Au@SiO$_2$.

Example 2—Moving of f-MNPs Stabilized Droplets by Light

Figure 10A:
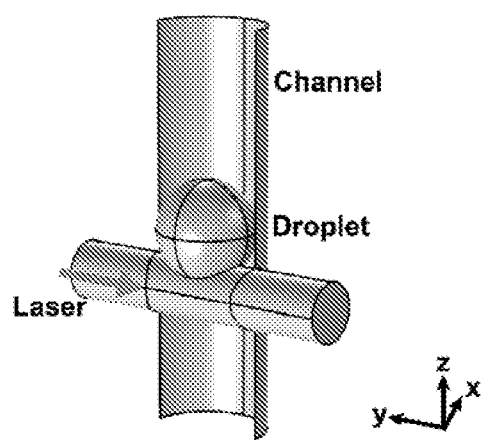
FIG. 10A shows a model construction of a numerical simulation of moving f-Au@SiO$_2$ stabilized droplet by laser.
Figure 10B:
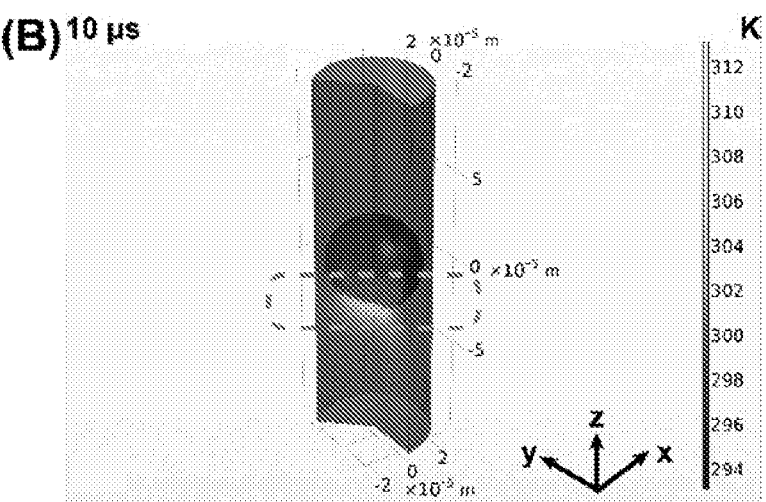
FIG. 10B shows a drawing of the temperature profile at illumination of 10 μs in the numerical simulation model as in FIG. 10A.
Figure 10C:
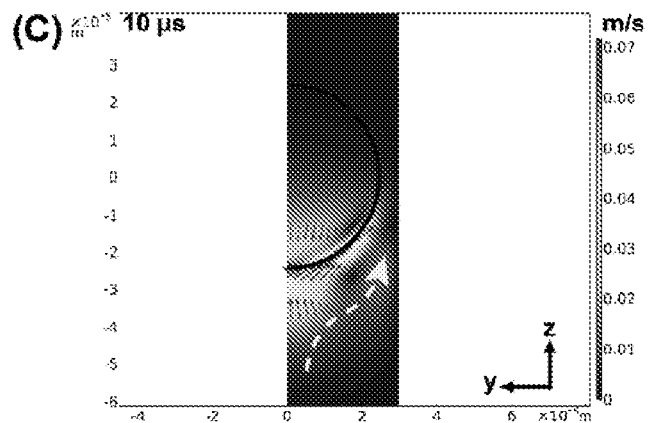
FIG. 10C shows the flow profile at illumination of 10 us in the numerical simulation model as in FIG. 10A.
Figure 10D:
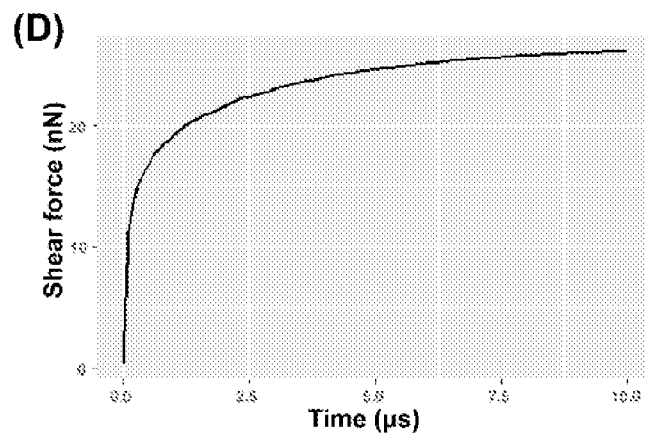
FIG. 10D shows the shear force in z direction on a droplet in the numerical simulation model as in FIG. 10A.

Apart from stabilizing water/oil droplets, f-Au@SiO$_2$ may serve as an "active" component based on its plasmonic photothermal effect, enabling the active manipulation of droplets by optical techniques. Light-mediated droplet moving has been illustrated in FIG. 5. Based on the moving, unequal droplet splitting and droplet sorting as in FIGS. 6A-7B are made possible. Numerical simulation and experiment are conducted to verify the moving effect. For the numerical simulation, a model is constructed in software COMSOL Multiphysics®, as shown in FIG. 10A. In a channel, a f-Au@SiO$_2$ stabilized droplet (diameter: 50 μm) is illuminated by a laser beam (power: 50 mW, beam radius: 7.5 μm) at one side. The distance between the center of droplet and laser beam is 30 μm. Under illumination, the f-Au@SiO$_2$ absorbs the energy of laser, transforming it to heat. At 10 us of illumination, the temperature near the illuminated region is increased from 293 K up to 312 K, as shown in FIG. 10B. The temperature gradient around the interface induces change of interfacial tension and corresponding Marangoni flow. Also at 10 us of illumination, the flow profile is displayed in FIG. 10C. The Marangoni flow is in the positive z direction in the continuous phase (see the arrows), which could shear the droplet to move along. For the first 10 μs, the shear force in positive z direction increases with illumination time, reaching up to 26 nN. These results provide theoretic basis for moving, more specifically pushing, f-Au@SiO$_2$ (and f-MNPs) stabilized droplets by laser.

Figure 11:
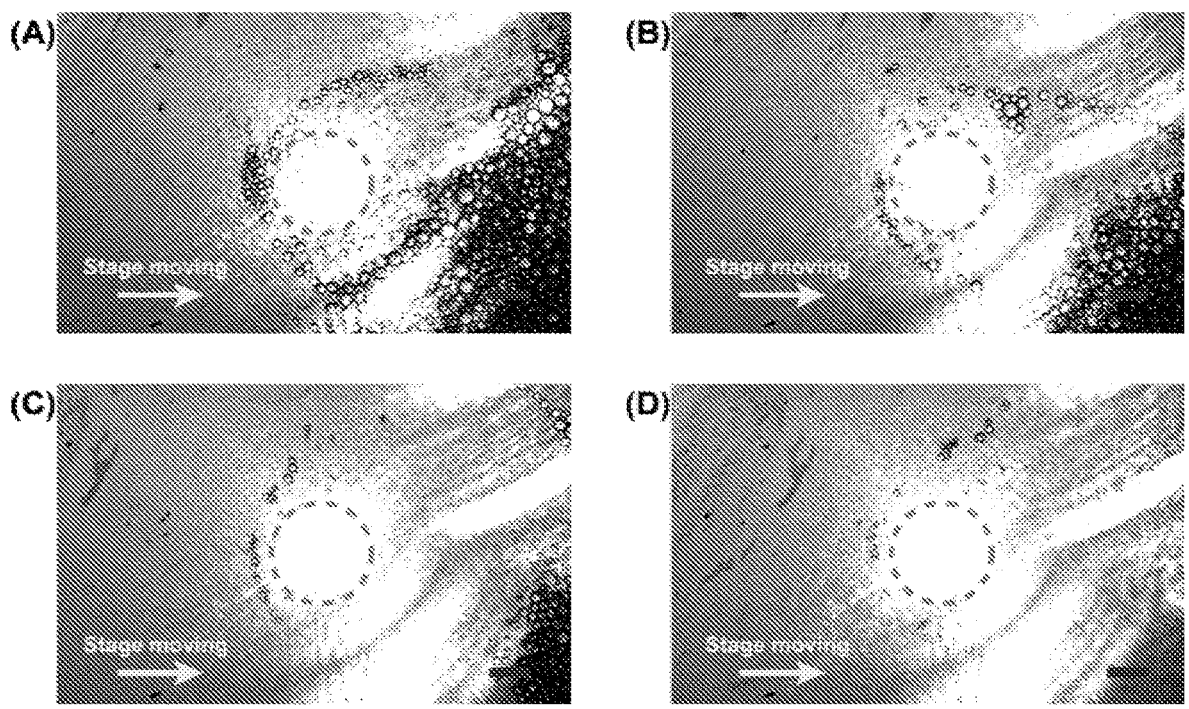
FIG. 11 shows an image sequence (A through D) of the f-Au@SiO$_2$ stabilized droplets moving by laser. The green circle refers to the position of laser beam. The red line stands for the scale bar of 50 μm.

The image sequence in FIG. 11 (from A to D) shows the moving of f-Au@SiO$_2$ stabilized droplets by light. The green circle refers to the position of laser beam, which is fixed. The droplets are moving to the right along with the sample stage. As shown in FIG. 11, when the droplets approach the laser beam, they tend to keep away from the laser beam rather than pass through it. As a result, the droplets arrange as a half-circle around be laser beam. The result indicates a pushing effect of the droplets by laser, which is in consistent with that in numerical simulation.

Example 3—Fluorescence-Activated Sorting of f-MNPs Stabilized Droplets

Figure 12A:
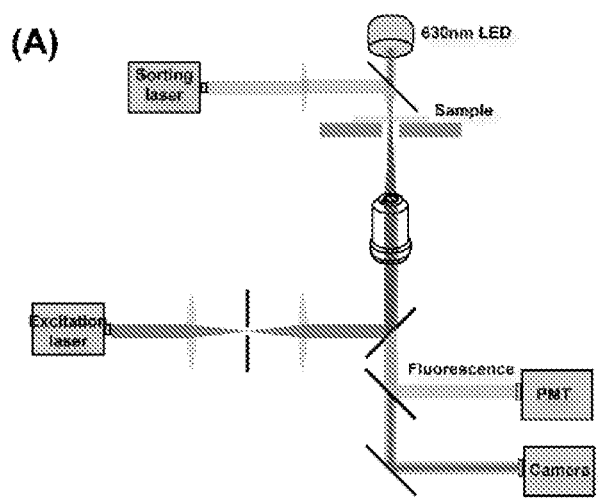
FIG. 12A shows the image of the system design for fluorescence-activated sorting of f-MNPs stabilized droplets.
Figure 12B:
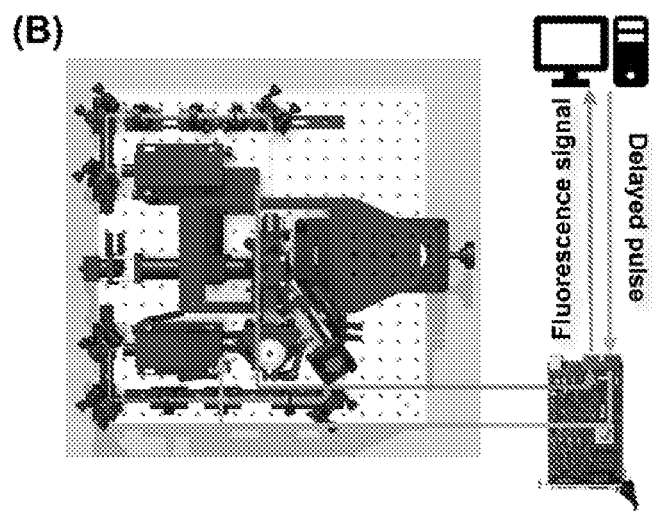
FIG. 12B shows the complete system design for fluorescence-activated sorting of f-MNPs stabilized droplets.

The working principle of fluorescence-activated sorting of f-MNPs stabilized droplets has been illustrated in FIGS. 7A and 7B. Compared to the optical system in FIG. 3A, one more light source is required for the excitation of fluorescence; the position of the light source should be deviated from the laser beam for sorting. For this purpose, another optical system is designed as shown in FIG. 12A. In this system, the excitation laser is focused to the sample from the bottom, while the sorting laser is from the top. With such design, the distance between the two laser spots can be easily adjusted. FIG. 12B shows the complete system for fluorescence-activated droplet sorting. The fluorescence signal detected by the photomultiplier tube (PMT) will be collected by the field programmable gate array (FPGA) board and sent to a custom-built Labview program for analysis. When the fluorescing droplets are detected, a delayed voltage pulse will be generated through the FPGA board to switch on the sorting laser, corresponding to the working principle in FIG. 7B.

All patents, patent applications, referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. Fluorinated metal nanoparticles (f-MNPs) stabilized aqueous droplets comprising f-MNPs, the f-MNPs comprising: a plurality of metal nanoparticles or semiconductor nanoparticles having size greater than 20 nm in cross-section, each of the nanoparticles being coated with fluorinated alkyl ligands that make the surface of the nanoparticles fluorophilic, wherein the f-MNPs function as surfactants for stabilizing aqueous droplets containing an aqueous core, wherein the f-MNPs stabilized aqueous droplets are suspended in a fluorinated solvent, wherein the diameter of the stabilized droplets ranges from 5 μm to 500 μm, and wherein the droplets contain at least one biomolecule and chemical reagent.

2. The f-MNPs stabilized aqueous droplets according to claim 1, wherein the metal of the plurality of metal nanoparticles is selected from the group consisting of gold, silver, platinum, nickel, palladium, cobalt, rhodium, rhenium, titanium, zinc, cerium, iron, iridium, and combinations thereof.

3. The f-MNPs stabilized aqueous droplets according to claim 1, wherein the fluorinated alkyl ligand is perfluoroalkanethiol of 6 to 26 carbons, or perfluoroalkoxysilane mediated by a layer of silica shell.

4. The f-MNPs stabilized aqueous droplets according to claim 1, wherein the metal is gold and the fluorinated alkyl ligand is 1H, 1H,2H,2H-perfluorodecanethiol.

5. A light-mediated microfluidic device, comprising a plurality of active f-MNPs stabilized aqueous droplets and at least two lasers including an excitation laser and a sorting laser, wherein at least one laser of the at least two lasers is tuned to a plasmon resonance frequency for the f-MNPs, wherein the laser is the sorting laser, wherein laser excitation by the sorting laser enables the merge, movement, splitting, and sorting of f-MNPs stabilized droplets, and, optionally, a feature to mechanically split an isolated active f-MNPs stabilized aqueous droplet, wherein the f-MNPs comprise a plurality of metal nanoparticles or semiconductor nanoparticles having a size greater than 20 nm in cross-section, each of the nanoparticles being coated with fluorinated alkyl ligands that make the surface of the nanoparticles fluorophilic, wherein the f-MNPs function as surfactants for the stabilized aqueous droplets, wherein the f-MNPs stabilized aqueous droplets contain an aqueous core, wherein the f-MNPs stabilized aqueous droplets are suspended in a fluorinated solvent, wherein the diameter of the stabilized droplets ranges from 5 µm to 500 µm, wherein the droplets contain at least one biomolecule and chemical reagent.

6. The light-mediated microfluidic device according to claim 5, wherein at least a second laser of the at least two lasers is tuned to an excitation frequency of a fluorescent or phosphorescent chemical within the active f-MNPs stabilized aqueous droplet, wherein the second laser is the excitation laser.

7. A method of manipulating an active f-MNPs stabilized aqueous droplet in a light-mediated microfluidic device according to claim 5, comprising:

introducing the plurality of active f-MNPs stabilized aqueous droplets into said light-mediated microfluidic device;

irradiating at least one spot in the light-mediated microfluidic device; and promoting stoppage of movement or initiation of movement of one of the plurality of active f-MNPs stabilized aqueous droplets that come in the vicinity or on the focus of the spot; or promoting merging of a contacting pair of the plurality of active f-MNPs stabilized aqueous droplets that come in the vicinity or on the focus of the spot.

8. The method according to claim 7, wherein a portion of the active f-MNPs stabilized aqueous droplets contains a fluorescent or phosphorescent chemical.

9. The method according to claim 8, further comprising activating the fluorescent or phosphorescent chemical by irradiating a laser beam at the absorption frequency of the fluorescent or phosphorescent chemical and detecting fluorescence or phosphorescence.

10. The method according to claim 9, wherein the irradiating of the spot in the light-mediated microfluidic device is controlled by detecting the fluorescence or phosphorescence.

11. The method according to claim 7, wherein the spot resides adjacent to the feature to mechanically split an isolated active f-MNPs stabilized aqueous droplet such that during irradiating the spot the active f-MNPs stabilized aqueous droplet undergoes splitting into two unequally sized active f-MNPs stabilized aqueous droplets.

12. The method according to claim 7, wherein at least one spot resides in a junction of at least two downstream microfluidic channels to direct the droplets into one of the downstream channels.

* * * * *